United States Patent Office 3,287,232
Patented Nov. 22, 1966

3,287,232
METHOD OF PRODUCING 3'- and 2'-
NUCLEOTIDES
Koji Mitsugi and Teruo Shiro, Kawasaki-shi, Kanagawa-ken, Shinji Okumura, Yokohama-shi, Kanagawa-ken, Kazuo Komagata, Tokyo, Hideo Katagiri, Kyoto-fu, Yoshio Tsuchiya, Yokohama-shi, Kanagawa-ken, and Masahiro Takahashi, Tokyo, Japan, assignors to Ajinomoto Co., Inc., Tokyo, Japan
No Drawing. Filed Mar. 24, 1964, Ser. No. 354,827
Claims priority, application Japan, Nov. 19, 1962, 37/50,791; Feb. 28, 1963, 38/8,744; Apr. 9, 1963, 38/17,468
19 Claims. (Cl. 195—28)

This is a continuation-in-part of our copending application Serial No. 323,257, filed November 13, 1963, and now abandoned.

The invention relates to a biochemical method of producing 3'- and 2'-nucleotides, and particularly to the phosphorylation of nucleosides in such a manner that the corresponding 3'- and 2'-nucleotides are preferentially produced.

We have found that nucleosides, such as purine- and pyrimidine-ribonucleosides, purine- and pyrimidine desoxyribonucleosides, imidazole ribosides, and their derivatives can be converted preferentially to the corresponding 3'- and 2'-nucleotides by incubation in an aqueous medium in the presence of certain microorganisms and of a suitable phosphate donor. The yields obtained are high enough to permit production of 3'- and 2'-nucleotides on an industrial scale.

At the present time, the 3'- and 2'-nucleotides are of interest mainly in medical and biological research, and the products of our method are capable of being purified in a simple, conventional manner for use in such research if purity is required.

The microorganisms which produce the 3'- and 2'-isomers of nucleotides in the method of the invention convert little, if any, nucleoside to the corresponding 5'-isomer, and the latter may readily be removed by known methods, if so desired. The quantitative relationship of the several isomeric phosphates in the phosphorylation mixture is characteristic of the nucleosides and microorganisms employed, and is not significantly affected by such process variables as the composition of the culture medium and the length of the cultivation period of the microorganisms prior to admixture thereof to the phosphorylation mixture, and it is also unaffected by the composition and by relatively large changes in the pH of the phosphorylation mixture.

The method is applicable to all nucleosides having an OH-radical available in the 2'- or 3'-position, that we have been able to test. The investigated nucleosides include such a wide variety of natural materials and of compounds not known to exist in nature that the method appears to be applicable to all compounds having a nucleoside structure.

The base component of the nucleoside has a distinct influence on the ratio of 2'- and 3'-isomers produced by phosphorylation. Under otherwise similar conditions, 3'-nucleotides are mainly obtained from purine nucleosides, and 2'-nucleotides from pyrimidine nucleosides. Desoxyribonucleosides are converted predominantly to the corresponding 3'-nucleotides, regardless of the base component.

The following list is representative of the nucleosides which can be preferentially converted to the 3' and/or 2' nucleotides by the method of our invention:

Inosine
Guanosine
Xanthosine
Adenosine
Uridine
Cytidine
Desoxyinosine
Desoxyguanosine
Desoxyadenosine
Desoxycytidine
Desoxyuridine
Thymidine
1-methylinosine
Adenosine-$N^1$-oxide
2-aminopurine ribonucleoside
2,6-diaminopurine ribonucleoside
6-methoxypurine ribonucleoside
6-mercaptopurine ribonucleoside
6-furfurylpurine ribonucleoside
6-thioguanosine
6-azauridine
5-hydroxy, 5-amino, 5-bromo-, and 5-chlorouridine
4-carboxyuridine (orotidine)
5-aminoimidazole riboside
5-amino-4-imidazolecarboxamide riboside
Adenosine-5'-acetate
Adenosine-5'-monosulfate
p-Nitrophenylthymidine-5'-phosphate The phosphorylation medium must be free of substances which interfere with the phosphotransferase activity of the enzymes produced by the microorganisms of our invention, but may otherwise contain those impurities which accompany the natural nucleosides as obtained in crude extracts, and corresponding amounts of such extracts may be employed instead of pure crystalline nucleosides in the several illustrative examples given hereinbelow.

The phosphate donors suitable for carrying out the method of the invention are known in themselves. They include naturally occurring esters of phosphoric acid, such as 3'- or 2'-nucleotides, and synthetic phosphoric acid esters, such as para-nitrophenyl phosphate, phenyl phosphate or benzyl phosphate. p-Nitrophenyl phosphate is preferred because of the lack of side reactions and because of the convenience with which the corresponding phenol and unreacted ester can be removed from phosphorylation mixtures.

The microorganisms which have been found preferentially to produce the 3'- and 2'-isomers of nucleotides without producing significant amounts of 5'-isomers are bacteria of the species *Escherichia coli, E. intermedia, E. freundii, Aerobacter aerogenes, Aeromonas punctata, Proteus mirabilis, Proteus vulgaris,* and *Proteus rettgerii.*

The microorganisms may be cultured in submerged cultures, stationary cultures or surface cultures at temperatures between 20 and 37° C. They reach maximum growth in 10 to 50 hours after inoculation in a medium containing conventional carbon and nitrogen sources and inorganic salts. The nitrogen source may be a peptone, meat extract, cornsteep liquor, yeast extract, dry yeast, soy bean meal hydrolyzate, soy bean extract, or an ammonium salt. Suitable carbon sources include molasses, glucose and starch hydrolyzate.

The phosphotransferase enzyme may be incorporated in the phosphorylation mixture in any desired manner. A culture medium containing living bacterial cells, a cell suspension in an aqueous medium, dried cells, cells extracted with acetone, a crude enzyme extract, or a purified enzyme preparation are equally effective when employed in suitable amounts. The sequence in which the enzyme, the nucleoside and the phosphate donor are mixed is unimportant.

Small amounts of copper and zinc salts in the phosphorylation mixture have been found to accelerate the formation of 3'- and 2'-nucleotides and favorably to affect the ultimate concentration of nucleotide that can be achieved. The phosphorylation mixture should be slightly acid. A pH of 3.0 to 5.0 is most favorable for production and accumulation of 3'- and 2'-nucleotides.

The metal salts are most effective when employed in concentrations of $10^{-2}$ to $10^{-3}$ moles per liter. The temperature is not critical as long as it is consistent with incubation of the microorganisms. Temperatures between 30° and 40° C. are generally preferred. The length of the incubation period is readily selected for maximum production according to the specific operating conditions employed. Incubation is terminated when the concentration of 3'- and 2'-nucleotides ceases to increase. Agitation of the reaction mixture during incubation is helpful.

The nucleotides may be separated from the phosphorylation mixture by methods conventional in themselves. Adsorption on ion-exchange resins, solvent extraction and precipitation are representative of the isolation methods that have been used successfully in the method of the invention. When p-nitrophenyl phosphate is employed as the phosphate donor, we prefer to remove the bacterial cells from the phosphorylation mixture by centrifuging, and to remove the residual nitrophenyl phosphate together with the nitrophenol formed in the reaction by extraction with organic solvents. Toluene, ethyl acetate, butanol, and other solvents which are not more than sparingly soluble in water are suitable.

The nucleotides are preferably adsorbed from the remaining liquid on an ion exchange resin, and eluted, whereby they are separated from most accompanying impurities. The eluate, which contains the 2'- and 3'-nucleotides, is netralized, partly evaporated to increase the nucleotide concentration, and the nucleotides are precipitated in crude crystalline form as the sodium or barium salts by adding ethanol to the aqueous solution of the salts.

The 3'- and 2'-nucleotides are readily identified by means of their ultra-violet absorption spectra, or by paper chromatography using a solvent mixture of 10 parts isobutyric acid and 6 parts 0.5 N ammonium hydroxide solution. A mixture of 2 parts isopropanol with 79 parts saturated aqueous ammonium sulfate solution and 19 parts N sodium acetate solution also may be employed to advantage. Paper electrophoresis in 10% acetic acid solution or in a 0.1 N borate buffer (pH 9.0) also yields dependable results. The presence of the 5'-isomers is detected by the carbazole reaction, by metaperiodate oxydation, or by the action of snake venom 5'-nucleotidase.

The following examples are further illustrative of the method of the invention, but it will be understood that the invention is not limited thereto.

*Example 1*

The bacteria listed in Table 1 were each cultured aerobically at 30° C. for 22 to 46 hours in a 500 milliliter shaking flask charged with 50 milliliters of an aqueous medium which contained 1% meat extract, 1% polypeptone, and 0.5% sodium chloride. The medium was adjusted to pH 7 and sterilized 10 minutes at 115° C. prior to inoculation with the bacteria. After culturing, the cells were collected by centrifuging, and suspended in 0.02% potassium chloride solution.

Five to ten milliliters of each suspension containing 0.2 gram cell material on a dry basis were added to 70 milliliter batches of an aqueous solution containing 0.54 g. adenosine, 2.6 g. disodium p-nitrophenylphosphate hexahydrate, and a metal salt. An asterisk (*) in the tables indicates the use of 0.025 g. cupric sulfate. In all other cases, 0.029 g. zinc sulfate were present in the medium. The phosphorylation mixtures were diluted to 100 milliliters and incubated at pH 4.0 and 37° C. for 24 hours. They were then analyzed for the several isomers of adenylic acid present, and for the p-nitrophenol liberated.

TABLE 1

| Bacteria | 5'- | 3'- | 2'- | p-Nitrophenol, g./dl. |
|---|---|---|---|---|
| | Adenylic acid, g./dl. | | | |
| E. coli (B-25) (ATCC 15,289) | 0.03 | 0.13 | 0.06 | 0.55 |
| Aerobact. aerogenes (ATCC 8329)* | 0.03 | 0.09 | 0.05 | 0.47 |
| Aerom. punctata (ATCC 1163) | 0.007 | 0.07 | 0.07 | 0.27 |
| Prot. mirabilis (OM-9) (ATCC 15,290) | 0.06 | 0.22 | 0.11 | 0.34 |

The manner in which the adenylic acid was recovered from the phosphorylation mixtures is exemplified by the following procedure applied to the mixture containing *Prot. mirabilis* (OM-9). The bacterial cells were removed by centrifuging, and the cell-free liquid was extracted with four batches of 20 milliliters ethyl acetate to remove the p-nitrophenol.

The remaining liquid (95 ml.) was adjusted to pH 8.0 and passed through a column (3.3 cm. x 21 cm.) packed with 200 milliliters Dowex—1 x 4 in the formate form. The column was washed with four liters water. 0.1 Normal formic acid was then fed to the column and the eluate was collected in 200 ml. fractions. Four groups of fractions contained material strongly absorbing ultraviolet light. Fractions Nos. 3–5 contained unreacted adenosine, Nos. 20–36 the 5'-adenylic acid, Nos. 42–55 the 2'-isomer, and Nos. 125–155 the 3'-isomer. The isomers were identified by UV absorption spectra and by paper chromatography.

The combined fractions respectively containing the 2'- and 3'-adenylic acid were each mixed with about 1–4 grams active charcoal (Norite SX–II). The ultraviolet absorbing material was adsorbed on the charcoal. The charcoal was washed with water, and the adenylic acid was eluted with about 250 to 500 milliliters of a mixture of 5 volumes ethanol, 3 volumes concentrated ammonium hydroxide solution, and 2 volumes water. The eluate was evaporated in a vacuum to final volume of 10 milliliters, and the pH of the residue was adjusted to 8.0.

About 0.8 milliliter of a 25% barium acetate solution were added, and thereafter 25 milliliters ethanol in several small batches, whereby the barium salts of 2'- and 3'-adenylic acid were precipitated in crystalline form from the respective mother liquors.

The crude barium salt of 2'-adenylic acid weighed 75 mg., that of 3'-adenylic acid weighed 183 mg.

*Example 2*

The phosphorylation of Example 1 was repeated with the same and additional microorganisms using 0.56 g. guanosine instead of the adenosine. The amounts of guanylic acid found in the mixtures by paper electrophoresis in 10% acetic acid solvent are shown in Table 2 together with the nitrophenol formed. The two last-mentioned strains are stock cultures of the Institute of Food Microbiology of Chiba University, Japan.

TABLE 2

| Bacteria | 5'- | 3'- and 2'- | p-Nitrophenol, g./dl. |
|---|---|---|---|
| | Guanylic acid, g./dl. | | |
| E. coli (B-25) | 0.02 | 0.11 | 0.56 |
| Aerobact. aerogenes* | 0.02 | 0.17 | 0.38 |
| Aerom. punctata* | 0.00 | 0.06 | 0.11 |
| Prot. mirabilis (OM-9)* | 0.03 | 0.35 | 0.37 |
| Proteus rettgerii (OR-9) | 0.03 | 0.28 | 0.75 |
| Proteus vulgaris (YO-13) | 0.03 | 0.15 | 0.29 |

The phosphorylation mixture containing *Prot. mirabilis* was centrifuged, and the liquid was passed over a column as in Example 1. The guanylic acid was eluted with a mixture of 0.1 N formic acid and 0.1 N sodium formate, and the eluate was collected in 200 ml. fractions. Unreacted guanosine was found in fractions Nos. 5–10. Fractions Nos. 36–42 contained the 5'-guanylic acid. The combined fractions Nos. 58–68 were worked up as in Example 1 to yield 96 mg. crude barium 2'-guanylate, and 176 mg. crude barium 3'-guanylate were recovered from fractions Nos. 89–120.

0.57 gram xanthosine, when subjected to phosphorylation in the manner of Examples 1 and 2, yielded 5', 3', and 2'-xanthylic acid as shown in Table 3.

TABLE 3

| Bacteria | 5'- | 3'- and 2'- | p-Nitrophenol, g./dl. |
|---|---|---|---|
| | Xanthylic acid, g./dl. | | |
| E. coli (B-25) | 0.01 | 0.22 | 0.47 |
| Aerobact. aerogenes | 0.00 | 0.10 | 0.41 |
| Aerom. punctata | 0.01 | 0.09 | 0.07 |
| Prot. mirabilis (OM-9) | 0.04 | 0.31 | 0.15 |

*Example 4*

Cell suspensions of the bacteria strains referred to in Example 1 were employed in the phosphorylation of inosine. The procedure was identical with that of Example 1 except for the substitution of 0.52 g. inosine for adenosine. The following results were obtained:

TABLE 4

| Bacteria | 5'- | 3'- and 2'- | p-Nitrophenol, g./dl. |
|---|---|---|---|
| | Inosinic acid, g./dl. | | |
| E. coli (B-25)* | 0.02 | 0.25 | 0.36 |
| Aerobact. aerogenes* | 0.01 | 0.15 | 0.32 |
| Aerom. punctata* | 0.03 | 0.23 | 0.25 |
| Prot. mirabilis | 0.04 | 0.35 | 0.31 |

The phosphorylation mixture containing *Prot. mirabilis* was worked up in the same manner as in Example 2, but a mixture of 0.1 N formic acid and 0.05 N sodium formate was used for elution. The 2'- and 5'-isomers were contained in fractions Nos. 61–72. Fractions Nos. 73–69 were treated with 3.5 g. charcoal, and the adsorbed material was eluted from the charcoal with aqueous ammoniacal ethanol as in Example 1. The crude barium salt of 3'-inosinic acid was obtained in a yield of 277 mg.

*Example 5*

Cell suspensions of the bacteria strains employed in Example 1 were used in the phosphorylation of 0.49 gram batches of cytidine in the manner of Example 1. The amounts of cytidylic acid and p-nitrophenol found in the phosphorylation mixture are listed in Table 5.

TABLE 5

| Bacteria | 5'- | 3'- and 2'- | p-Nitrophenol, g./dl. |
|---|---|---|---|
| | Cytidylic acid, g./dl. | | |
| E. coli (B-25) | 0.02 | 0.10 | 0.59 |
| Aerobact. aerogenes* | 0.01 | 0.11 | 0.36 |
| Aerom. punctata* | 0.00 | 0.03 | 0.09 |
| Prot. mirabilis (OM-9) | 0.03 | 0.27 | 0.26 |

The reaction mixture obtained from *Prot. mirabilis* was worked up as described in Example 1. Fraction Nos. 55–106 eluted from the resin column contained the 2'- and 3'-cytidylic acids. A mixture of the two acid isomers was recovered in the form of the barium salts weighing 285 milligrams.

*Example 6*

Uridine was phosphorylated in the presence of the bacterial strains identified in Example 1. The procedure was analogous to that of Example 1 except for the use of 0.49 g. uridine instead of adenosine. The results obtained are listed below.

TABLE 6

| Bacteria | Uridylic acid, g./dl. | p-Nitrophenol, g./dl. |
|---|---|---|
| E. coli (B-25) | 0.12 | 0.51 |
| Aerobact. aerogenes* | 0.13 | 0.31 |
| Aerom. punctata* | 0.03 | 0.09 |
| Prot. mirabilis (OM-9) | 0.13 | 0.23 |

The reaction mixture obtained from *Prot. mirabilis* was further processed as in Example 1, but a mixture of 0.004 N formic acid and 0.04 N ammonium formate was used as an eluent on the resin column. Fractions Nos. 100–151 yielded 123 mg. of mixed barium salts of the several isomeric uridylic acids.

*Example 7*

An aqueous medium containing 1% glucose, 1% meat extract, 1% polypeptone, and 0.5% sodium chloride was adjusted to pH 7.0 and sterilized 10 minutes at 115° C. Respective batches of the medium were then inoculated with the bacteria strains listed in Table 7, and cultured aerobically at 30° C. in 500 ml. shaking flasks until maximum growth of the microorganisms had been reached (10 to 50 hours). The contents of each flask were then centrifuged, and the collected cells were suspended in 0.02% potassium chloride solution.

An amount of each suspension sufficient to contain 0.2 gram dry cell material (5–20 ml.) was added to 80 milliliters of a solution containing 0.5 gram desoxyadenosine, 2.2 g. disodium p-nitrophenylphosphate hexahydrate, and 0.02 g. zinc sulfate, except where an asterisk (*) indicates the replacement of the zinc sulfate by 0.025 g. cupric sulfate. Each phosphorylation mixture was diluted to 100 ml., adjusted to pH 4.0, and incubated 20 hours at 37° C. The phosphorylation mixtures obtained did not contain significant amounts of 5'-desoxyadenylic acid. Analysis results are listed in Table 7.

TABLE 7

| Bacteria | 3'-desoxyadenylic acid, g./dl. | p-Nitrophenol, g./dl. |
|---|---|---|
| E. coli (B-25)* | 0.05 | 0.22 |
| Aerobact. aerogenes* | 0.11 | 0.26 |
| Aerom. punctata* | 0.10 | 0.10 |
| Prot. mirabilis (OM-9)* | 0.35 | 0.26 |

The cells of *Prot. mirabilis* were removed from the phosphorylation mixture last listed in Table 7 by centrifuging, and p-nitrophenol was removed from the cell-free liquid by extraction with four batches of 20 ml. ethyl acetate each. The extracted solution was adjusted to pH 8.0 and was passed through a column (2 cm. x 32 cm.) packed with approximately 100 ml. Dowex—1 x 4 in the formate form. The column was washed with four liters water, and fractionally eluted with 0.1 N formic acid. The eluate between 0.1 and 0.6 liter contained unreacted desoxyadenosine. Between 1.2 and 2.3 liters, it contained traces of 5'-desoxyadenylic acid capable of being identified, and 3'-desoxyadenylic acid was eluted between 3.6 an 4.8 liters.

*Example 8*

E. coli (B-25) and Prot. mirabilis (OM-9) were employed in the presence of copper sulfate in the phosphorylation of desoxyadenosine (0.5 g.) in the manner of Example 7. The phosphorylation mixtures did not contain measurable amounts of 5'-desoxyinosinic acid, but 0.09 and 0.37 g./dl. respectively of the 3'-isomer and 0.24 and 0.50 g./dl. respectively of p-nitrophenol.

The reaction mixture obtained from Prot. mirabilis was resolved by elution from a resin column as in Example 7 with a mixture of 0.05 N formic acid and 0.025 N sodium formate. The effluent fractions between 8.6 and 9.7 liters contained 345 mg. of free 3'-desoxyinosinic acid.

*Example 9*

Cell suspensions of the strains employed in Example 7 were used in the phosphorylation of desoxyguanosine (0.27 g.) by the procedure of Example 7. The phosphorylation mixtures were free of measurable amounts of 5'-desoxyguanylic acid. Other analysis results are found in Table 8.

TABLE 8

| Bacteria | 3'-desoxy-guanylic acid, g./dl. | p-Nitrophenol, g./dl. |
|---|---|---|
| E. coli (B-25)* | 0.20 | 0.30 |
| Aerobact. aerogenes* | 0.19 | 0.25 |
| Aerom. punctata | 0.15 | 0.27 |
| Prot. mirabilis (OM-9)* | 0.24 | 0.40 |

*Example 10*

Cell suspensions of the strains of E. coli and Prot. mirabilis were employed in the manner of Example 7 for the phosphorylation of 0.45 g. desoxycytidine in each batch of reaction mixture. When phosphorylation was completed, significant amounts of 5'-desoxycytidylic acid were absent from the reactions mixtures, but they contained 0.09 and 0.52 g./dl. respectively of the 3'-isomer, 0.20 and 0.50 g./dl. respectively of p-nitrophenol.

The phosphorylation mixture obtained from E. coli (ATCC 15289) and Prot. mirabilis (OM-9) was worked up as in Example 7, 0.01 N formic acid being employed for elution from the resin column. The 3'-isomer was found in the portion of the eluate between 0.5 and 0.9 liter, and 460 mg. of the barium salt of 3'-desoxycytidylic acid were recovered.

*Example 11*

The procedure of Example 10 was repeated with 0.48 g. thymidine and zinc sulfate in each phosphorylation batch instead of the desoxycytidine and copper sulfate. Measurable amounts of 5'-thymidic acid were not found after phosphorylation, but the reaction mixtures respectively contained 0.35 and 0.49 g./dl. of the 3'-isomer, and 0.53 and 0.44 g./dl. p-nitrophenol.

*Example 12*

Cell suspensions of the strains of bacteria listed in Table 9 were prepared in the manner of Example 1. Each suspension contained 30 mg. cell material on a dry basis per milliliter. One milliliter from each suspension was added to respective 10 milliliter batches of a solution containing 0.05 g. 5-amino-4-imidazolecarboxamide riboside (AICAR), 0.26 g. disodium p-nitrophenylphosphate, hexahydrate, and 0.0025 g. copper sulfate. The mixture was incubated 24 hours at 37° C. and pH 4.0. The combined amounts of phosphorylated derivatives are indicated in Table 9 in mg./dl. and in percents of yield based on the AICAR originally present. The bacterial strains not identified by ATCC numbers in Table 9 were obtained from stock cultures maintained at the Institute of Food Microbiology of Chiba University, Japan, and are identified by the code numbers of the Institute.

TABLE 9

| Bacteria | Phosphorylated AICAR | |
|---|---|---|
| | G./dl. | Yield, Percent |
| E. coli (B-25) (ATCC 15,289) | 0.03 | 4.0 |
| E. freundii (T-36) | 0.016 | 2.4 |
| E. intermedia (A-21) | 0.02 | 3.0 |
| Aerobact. aerogenes (ATCC 8329) | 0.03 | 4.0 |
| Aerom. punctata (ATCC 1163) | 0.04 | 6.0 |
| Prot. mirabilis (OM-9) (ATCC 15,290) | 0.22 | 33.0 |
| Prot. vulgaris (YO-4) | 0.06 | 9.0 |
| Prot. rettgerii (OR-1) | 0.04 | 6.0 |

The phosphorylated AICAR mainly consisted of the 3'-isomer.

*Example 13*

The method of Example 7 was employed in preparing cell suspensions of the strains listed in Table 10. 20 ml. of each suspension containing 0.1 g. cell material on a dry basis were mixed with 80 ml. batches of a solution containing 0.63 g. 6-thioguanosine, 2.6 g. disodium p-nitrophenylphosphate hexahydrate, and 0.026 g. cupric sulfate. The mixtures were incubated 20 hours at pH 4.0 and 37° C. and then analyzed. The results obtained are listed in Table 10.

TABLE 10

| Bacteria | 5'- | 3'- and 2'- | p-Nitrophenol, g./dl. |
|---|---|---|---|
| | 2-Thioguanosine phosphate, g./dl. | | |
| E. coli (B-25) | Trace | 0.06 | 7.0 |
| Prot. mirabilis (OM-9) | 0.04 | 0.32 | 44.0 |
| Aerobact. aerogenes (ATCC 8329) | Trace | 0.19 | 24.0 |

The phosphorylation mixture obtained from Prot. mirabilis was centrifuged to remove the cells, and the liquid concentrated in a vacuum at 55–60° C. and pH 4.0 to 10 ml. 10 ml. ethanol were added to the concentrate, and a precipitate was thereby formed. It was removed by filtration, and the filtrate was adjusted to pH 7.0 with NaOH solution and kept at 0° to 5° C. for 40 hours to induce crystallization.

210 milligrams 6-thioguanosine phosphate were recovered as the sodium salt by filtration, washing with 20 ml. 80% ethanol, and drying. The substance had maximum absorption bands at 262 millimicrons and 345 millimicrons on 0.1 N HCl solution. It contained about 12% of the 5'-isomer as determined by metaperiodate oxidation and by snake venom 5'-nucleotidase action.

*Example 14*

Cell suspensions of the strains of bacteria enumerated in Table 11 were prepared as described in Example 7. 20 milliliters of each cell suspension containing 0.1 g. cell material on a dry basis were mixed with 80 ml. of a solution containing 0.48 g. 6-azauridine, 2.2 g. disodium p-nitrophenyl phosphate hexahydrate, and 0.026 g. zinc sulfate. The mixtures were incubated 20 hours at pH 4.0 and 37° C.

Analysis of the phosphorylation mixtures gave the results listed in Table 11.

TABLE 11

| Bacteria | 5'- | 3'- and 2'- | Total yield of azauridine phosphate, Percent |
|---|---|---|---|
| | 6-azauridine phosphate, g./dl. | | |
| E. coli (B-25) | 0.09 | 0.14 | 36.5 |
| Prot. mirabilis (OM-9) | 0.07 | 0.145 | 34.0 |
| Aerom. punctata (ATCC 1163) | 0.03 | 0.10 | 20.0 |

The reaction mixture obtained from *Prot. mirabilis* was worked up in the manner of Example 13. The sodium salt of 105 mg. 6-azauridine phosphate was recovered. It had a maximum absorption band at 260 millimicrons, and consisted of about 32% of the 5'-isomer, the balance consisting essentially of the 3'- and the 2'-isomer.

*Example 15*

Cell suspensions of the bacteria listed in Table 12 were prepared in the manner of Example 7. 10 ml. of each cell suspension containing 0.05 g. dry cell material were mixed with respective 40 ml. batches of an aqueous solution containing 0.32 g. 5-bromouridine, 1.3 g. disodium p-nitrophenylphosphate hexahydrate, and 0.013 g. zinc sulfate. The mixtures were incubated 20 hours at pH 4.0 and 37° C. Analysis thereafter yielded the data of Table 12.

TABLE 12

| Bacteria | 5'- | 3'- and 2'- | Yield, percent |
|---|---|---|---|
| | 5-bromouridine, g./dl. | | |
| E. coli (B-25) | Trace | 0.09 | 10.0 |
| Aerobact. aerogenes (ATCC 8329) | Trace | 0.21 | 24.0 |
| Prot. mirabilis (OM-9) | 0.09 | 0.45 | 62.0 |

The reaction mixture obtained from *prot. mirabilis* was worked up as described in Example 13. 115 mg. 5-bromouridine phosphate were obtained in the form of the sodium salt. The product had a maximum absorption band at 280 millimicrons. It contained about 20% of the 5'-isomer. The balance essentially consisted of the 3'- and 2'-isomers.

*Example 16*

Cell suspensions of the bacteria listed in Table 13 were prepared as in the preceding examples. 20 ml. of each cell suspension contained 0.24 g. dry cell material and were added to 80 ml. batches of a solution containing 0.56 g. 2,6-diaminopurine ribonucleoside, 2.6 g. disodium p-nitrophenylphosphate hexahydrate, and 0.026 g. copper sulfate. The mixtures were incubated 25 hours at pH 4.0 and 37° C. The amounts of 2,6-diaminopurine ribonucleotide found by analysis are listed in Table 13.

TABLE 13

| Bacteria | 5'- | 3' and 2' | Yield, percent |
|---|---|---|---|
| | 2,6-diaminopurine ribonucleotide, g./dl. | | |
| E. coli (B-25) | 0.02 | 0.11 | 19.0 |
| Prot. mirabilis (OM-9) | 0.04 | 0.30 | 47.0 |
| Aerom. punctata (ATCC 1163) | 0.04 | 0.22 | 38.0 |

The reaction mixture obtained from *Aerom. punctata* was processed as described in Example 13. 105 mg. of a sodium salt were obtained which had maximum absorption bands at 255 and 290 millimicrons, as well as those of 2,6-diaminopurine nucleoside. The product contained about 20% of the 5'-isomer, and the remainder consisted mainly of the 3'-isomer and of 2'-isomer.

*Example 17*

A cell suspension of *Prot. mirabilis* (OM-9) was prepared as in Example 7. 20 ml. of the suspension which contained 0.28 g. dry cell substance were mixed with 80 ml. of a solution containing 0.5 g. 5-hydroxyuridine, 2.6 g. disodium p-nitrophenylphosphate hexahydrate, and 0.029 g. zinc sulfate. The mixture was incubated 28 hours at pH 4.0 and 37° C. 195 mg. of 5-hydroxyuridine phosphate were recovered from the phosphorylation mixture by the procedure described in the preceding examples. The material had a maximum absorption band at 280 millimicrons. It contained about 25% of the 5'-isomer as the sodium salt, the balance being 3'-isomer and 2'-isomer.

*Example 18*

Cell suspension of *E. coli* and *Prot. mirabilis* were prepared by the method employed in Example 7. Various nucleosides listed in Table 14 were phosphorylated in the presence of the bacterial cells by 24 hours incubation at pH 4.0 and 37° C. Each phosphorylation mixture originally contained 0.2 millimole of the nucleoside, 0.26 g. disodium p-nitrophenylphosphate hexahydrate, 2.6 mg. cupric sulfate, and 30 mg. dry cell substance in a total volume of 10 ml.

TABLE 14

| Nucleoside | Molar nucleotide yield with E. coli (B-25) | | Prot. mirabilis (OM-9) | |
|---|---|---|---|---|
| | 5'-isomer | 3'- and 2'-isomer | 5'-isomer | 3'- and 2'-I. |
| 1-methylinosine | 5 | 29 | 10 | 40 |
| Adenosine-N¹-oxide | 6 | 30 | 12 | 60 |
| 2-aminopurine ribonucleoside | 5 | 31 | 12 | 65 |
| 6-mercaptopurine ribonucleoside | 4 | 20 | 8 | 32 |
| 6-furfurylpurine ribonucleoside | 5 | 30 | 10 | 40 |
| Adenosine-5-acetate | 0 | 21 | 0 | 66 |
| Adenosine-5-monosulfate | 0 | 19 | 0 | 59 |
| p-Nitrophenylthymidine-5'-phosphate | | | 0 | [1] 34 |

[1] 3'- and 2'-ester of p-nitrophenylthymidine-5'-phosphate.

While the invention has been described with particular reference to specific embodiments, it is to be understood that it is not limited thereto but is to be construed broadly and restricted solely by the scope of the appended claims.

What is claimed is:

1. A method of producing 3'-nucleotides and mixtures thereof with the corresponding 2'-nucleotides which comprises:
  (a) culturing a microorganism selected from the species *Escherichia coli, Escherichia freundii, Escherichia intermedia, Aerobacter aerogenes, Aeromonas punctata, Proteus mirabilis, Proteus vulgaris,* and *Proteus rettgerii* on an aqueous medium containing a carbon source and a nitrogen source, whereby a phosphotransferase enzyme is produced by said microorganism;

(b) incubating a nucleoside in the presence of said enzyme and a phosphate donor until said nucleotides are formed; and (c) recovering said nucleotides.

2. A method as set forth in claim 1, wherein said medium is at a pH value between 3.5 and 7.0.

3. A method as set forth in claim 1, wherein said medium contains metal ions selected from the group consisting of copper and zinc ions.

4. A method as set forth in claim 1, wherein said microorganism is of the genus Escherichia, and of a species selected from the group consisting of *Escherichia coli*, *Escherichia freundii*, and *Escherichia intermedia*.

5. A method as set forth in claim 1, wherein said microorganism is of the species *Aerobacter aerogenes*.

6. A method as set forth in claim 1, wherein said microorganism is of the species *Aeromonas punctata*.

7. A method as set forth in claim 1, wherein said microorganism is of the genus Proteus, and of a species selected from the group consisting of *Proteus mirabilis*, *Proteus vulgaris*, and *Proteus rettgerii*.

8. A method as set forth in claim 1, wherein said phosphate donor is p-nitrophenylphosphate.

9. A method as set forth in claim 1, wherein said nucleoside is selected from the group consisting of inosine, guanosine, xanthosine, adenosine, uridine, cytidine, desoxyinosine, desoxyguanosine, desoxyadenosine, desoxycytidine, desoxyuridine, thymidine, 1-methylinosine, adenosine-$N^1$-oxide, 2-aminopurine ribonucleoside, 2,6-diaminopurine ribonucleoside, 6-methoxypurine ribonucleoside, 6-mercaptopurine ribonucleoside, 6-furfurylpurine ribonucleoside, 6-thioguanosine, 6-azauridine, 5-hydroxy, 5-amino, 5-bromo-, and 5-chlorouridine, 4-carboxyuridine (orotidine), 5-aminoimidazole riboside, 5-amino-4-imidazolecarboxamide riboside, adenosine-5'-acetate, uridine-5'-acetate, adenosine - 5' - monosulfate, p-nitrophenylthymidine-5'-phosphate.

10. A method as set forth in claim 1, wherein said microorganism is *Escherichia coli* ATCC No. 15,289.

11. A method as set forth in claim 1, wherein said microorganism is *Escherichia freundii* No. T-36.

12. A method as set forth in claim 1, wherein said microorganism is *Escherichia intermedia* No. A-21.

13. A method as set forth in claim 1, wherein said microorganism is *Aerobacter aerogenes* ATCC No. 8,329.

14. A method as set forth in claim 1, wherein said microorganism is *Aeromonas punctata* ATCC No. 1,163.

15. A method as set forth in claim 1, wherein said microorganism is *Proteus mirabilis* ATCC No. 15,290.

16. A method as set forth in claim 1, wherein said microorganism is *Proteus vulgaris* No. YO-4.

17. A method as set forth in claim 1, wherein said microorganism is *Proteus rettgerii* No. OR-1.

18. A method as set forth in claim 1, wherein said microorganism is *Proteus rettgerii* No. OR-9.

19. A method as set forth in claim 1, wherein said microorganism is *Proteus vulgaris* No. YO-13.

References Cited by the Examiner

UNITED STATES PATENTS

| | | | |
|---|---|---|---|
| 3,074,929 | 1/1963 | Hitchings et al. | 260—211.5 |
| 3,150,058 | 9/1964 | Katagiri et al. | 195—28 |
| 3,152,967 | 10/1964 | Katagiri et al. | 195—28 |

OTHER REFERENCES

Browerman et al.: Biochimica et Biophysica Acta, vol. 16, pages 524 to 532 (1955).

A. LOUIS MONACELL, *Primary Examiner*.

ALVIN E. TANENHOLTZ, *Examiner*.